United States Patent
Kiswani et al.

[11] Patent Number: 6,160,995
[45] Date of Patent: Dec. 12, 2000

[54] METHOD AND SYSTEM FOR UNIFORM CALL TERMINATION TREATMENT IN A GLOBAL COMMUNICATIONS NETWORK

[75] Inventors: David Taisser Kiswani, German Town, Md.; Robert Lawrence Vence, Arlington, Va.; Robert Kyle Smith, Oakton, Va.; John Kennedy McNiff, Alexandria, Va.; Ronni Evans, Chantilly, Va.

[73] Assignee: Iridium IP LLC, Restin, Va.

[21] Appl. No.: 09/158,488

[22] Filed: Sep. 22, 1998

[51] Int. Cl.[7] ........................................... H04Q 7/08
[52] U.S. Cl. .................. 455/31.2; 455/413; 379/67.1; 379/88.12; 379/88.15; 379/88.26
[58] Field of Search ...................... 455/412, 413, 455/31.1, 31.2, 31.3, 458, 403; 379/67.1, 88.11, 88.12, 88.15, 88.18, 88.25, 88.26; 340/825.44

[56] References Cited

U.S. PATENT DOCUMENTS

| | | | |
|---|---|---|---|
| 5,313,515 | 5/1994 | Allen et al. | 455/413 |
| 5,506,888 | 4/1996 | Hayes et al. | 455/413 X |
| 5,953,638 | 9/1999 | Flood et al. | 455/31.2 |

*Primary Examiner*—Fan Tsang
*Assistant Examiner*—Philip J. Sobutka
*Attorney, Agent, or Firm*—Sawyer Law Group LLP

[57] ABSTRACT

The present invention provides a method for uniform call termination treatment in a global telecommunications network, the network including subscribers and wireless subscriber units. The method includes the steps of receiving calls for the wireless subscriber units for the global telecommunications network; determining unconnected calls that cannot be connected to the subscriber units; and uniformly providing alternative call termination treatment options to each of the unconnected calls. In the preferred embodiment, the reasons why the call cannot be connected to the wireless subscriber unit includes the unit being not reachable, busy, or not being answered. A caller is given the same option to leave either a voice message, a numeric message, or a text message under each of the above circumstances. In this manner, incoming calls are handled uniformly. Because calls are uniformly completed, network providers can bill for each call, minimizing lost revenue. Subscribers have the added benefit of being notified that a call was attempted and that a message was left. The subscribers then may return the call using the wireless subscriber unit, resulting in more revenue for the network.

7 Claims, 10 Drawing Sheets

Uniform Call Termination Flow

Uniform Call Termination Flow

METHOD AND SYSTEM FOR UNIFORM CALL TERMINATION TREATMENT IN A GLOBAL COMMUNICATIONS NETWORK

FIELD OF THE INVENTION

The present invention relates to telecommunications networks, and in particular to the uniform call termination treatment of wireless telephone calls in a global telecommunications network.

BACKGROUND OF THE INVENTION

With the development of a global economy, business persons who regularly travel to other countries are a fast growing breed. To meet their needs, satellite-based global telecommunications networks are being developed. The first such network is to be commercially activated by Iridium LLC on Nov. 1, 1998. These networks provide international wireless phone, paging, fax, and data services. When a caller phones a network subscriber by dialing his phone number, one of four termination scenarios conventionally occurs: (1) the call completes to the wireless phone; (2) the wireless phone is "not reachable", i.e., out of coverage area or turned off; (3) the wireless phone rings but is not answered; or (4) the wireless phone is busy. In scenarios (2)–(4), the subscriber may miss important calls, and the network provider cannot bill for the use of its network since the calls were not completed, leading to lost revenue.

Accordingly, there exists a need for a uniform call termination method for a global telecommunications network which allows subscribers to receive messages and for network providers to bill for the use of their network when a network phone is not reachable, not answered, or busy. The present invention addresses such a need.

SUMMARY OF THE INVENTION

The present invention provides a method for uniform call termination treatment in a global telecommunications network, the network including subscribers and wireless subscriber units. The method includes the steps of receiving calls for the wireless subscriber units for the global telecommunications network; determining unconnected calls that cannot be connected to the subscriber units; and uniformly providing alternative call termination treatment options to each of the unconnected calls. In the preferred embodiment, the reasons why the call cannot be connected to the wireless subscriber unit includes the unit being not reachable, busy, or not being answered. A caller is given the same option to leave either a voice message, a numeric message, or a text message under each of the above circumstances. In this manner, incoming calls are handled uniformly. Because calls are uniformly completed, network providers can bill for each call, minimizing lost revenue. Subscribers have the added benefit of being notified that a call was attempted and that a message was left. The subscribers then may return the call using the wireless subscriber unit, resulting in more revenue for the network.

DETAILED DESCRIPTION

The present invention provides a method for uniform call termination treatment for a global telecommunications network which allows subscribers to receive messages and for network providers to bill for the use of their network when a network phone is not reachable, not answered, or busy. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a method for handling incoming calls to a network wireless subscriber unit (WSU) where the caller is given the same option to leave a voice-mail message, a numeric message, or a text message regardless of whether the WSU is not reachable, busy, or unanswered. In this way, incoming calls are uniformly handled.

To more particularly describe the features of the present invention, please refer to FIGS. 1 through 10 in conjunction with the discussion below.

To understand the method for uniform call termination treatment in accordance with the present invention, first the preferred embodiment of the telecommunications system which may use the present invention needs to be described.

Figure 1:
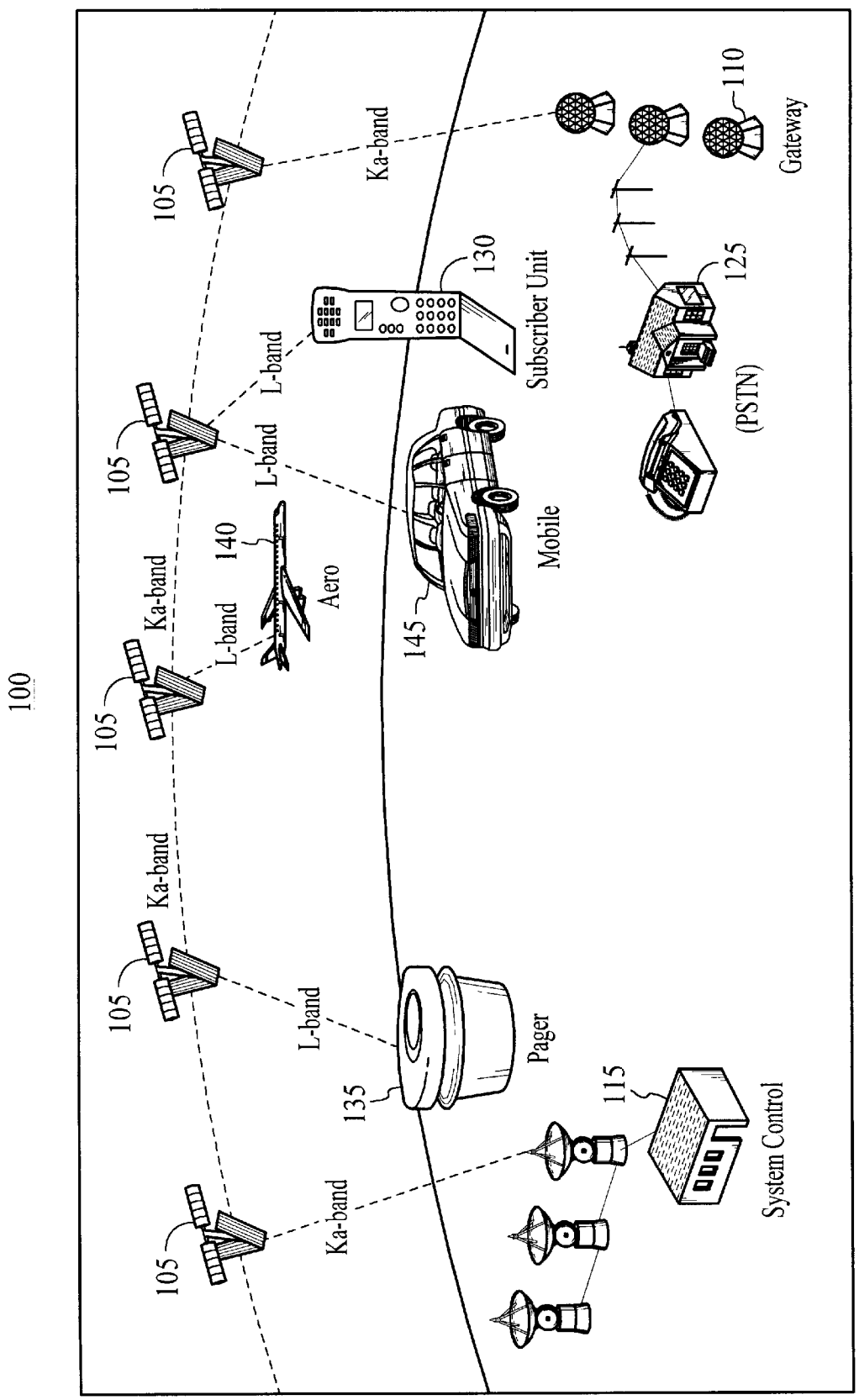
FIG. 1 illustrates a global telecommunications network which may use the present invention.

FIG. 1 illustrates a telecommunications system which may be used with the present invention. The system 100 includes low earth orbiting satellites 105, gateways 110, and system control 115. System Control 115 serves as the central management component for the system 100. Gateways 110 interconnect the satellite constellation 105 with public switched telephone networks 125 (PSTN), making communication possible between system wireless subscriber units (WSU) 130, such as a wireless phone or a fixed wireless device, and any other telephone in the world. Telecommunications services may also be provided to pagers 135, aircrafts 140, and automobiles 145.

Figure 2:
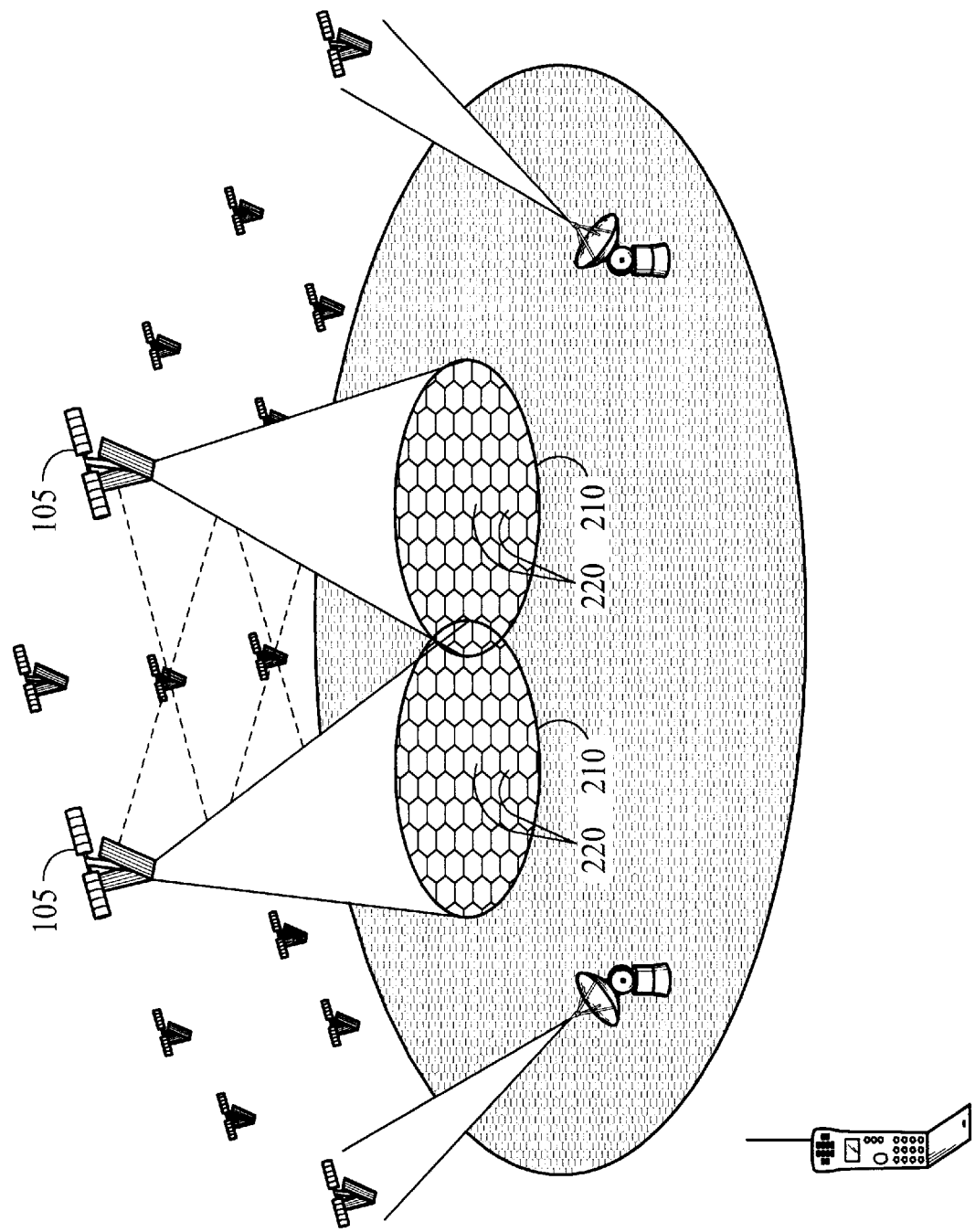
FIG. 2 illustrates satellite footprints of the global telecommunications network of FIG. 1.

The satellites 105 of the system 100 employ intersatellite links 150, or "crosslinks", to communicate directly with each other. These crosslinks 150 provide reliable, high-speed communications between neighboring satellites, allowing call routing and administration to occur efficiently. As illustrated in FIG. 2, each satellite 105 in the constellation has a ground coverage area called a "footprint" 210. The footprint 210 is further divided into smaller areas called "cells" 220. The footprints 210 of the satellites are overlapped to provide maximum coverage.

For a preferred embodiment of the call processing architecture of the system 100, the globe is divided into Location Area Codes (LACs). Each LAC is a service location for the system 100. Each gateway 110 services a certain set of LACs. For example, when a user makes a call from his/her WSU 130 to a particular location, the WSU 130 first links with a satellite 150 which has a cell servicing his/her current LAC. The WSU 130 requests a satellite channel for the call. The request is sent to the gateway 110 which services the caller's LAC. This gateway 110 then initiates the opening of a channel between the WSU 130 and the satellite 110. Once the channel is established, the signal for the phone call is routed through the crosslinks 150 of the satellites 105 to the gateway 110 servicing the LAC of the call's destination. This gateway 110 then sends the call to the PSTN 125 which routes the signal to the particular WSU 130 called.

Figure 3:
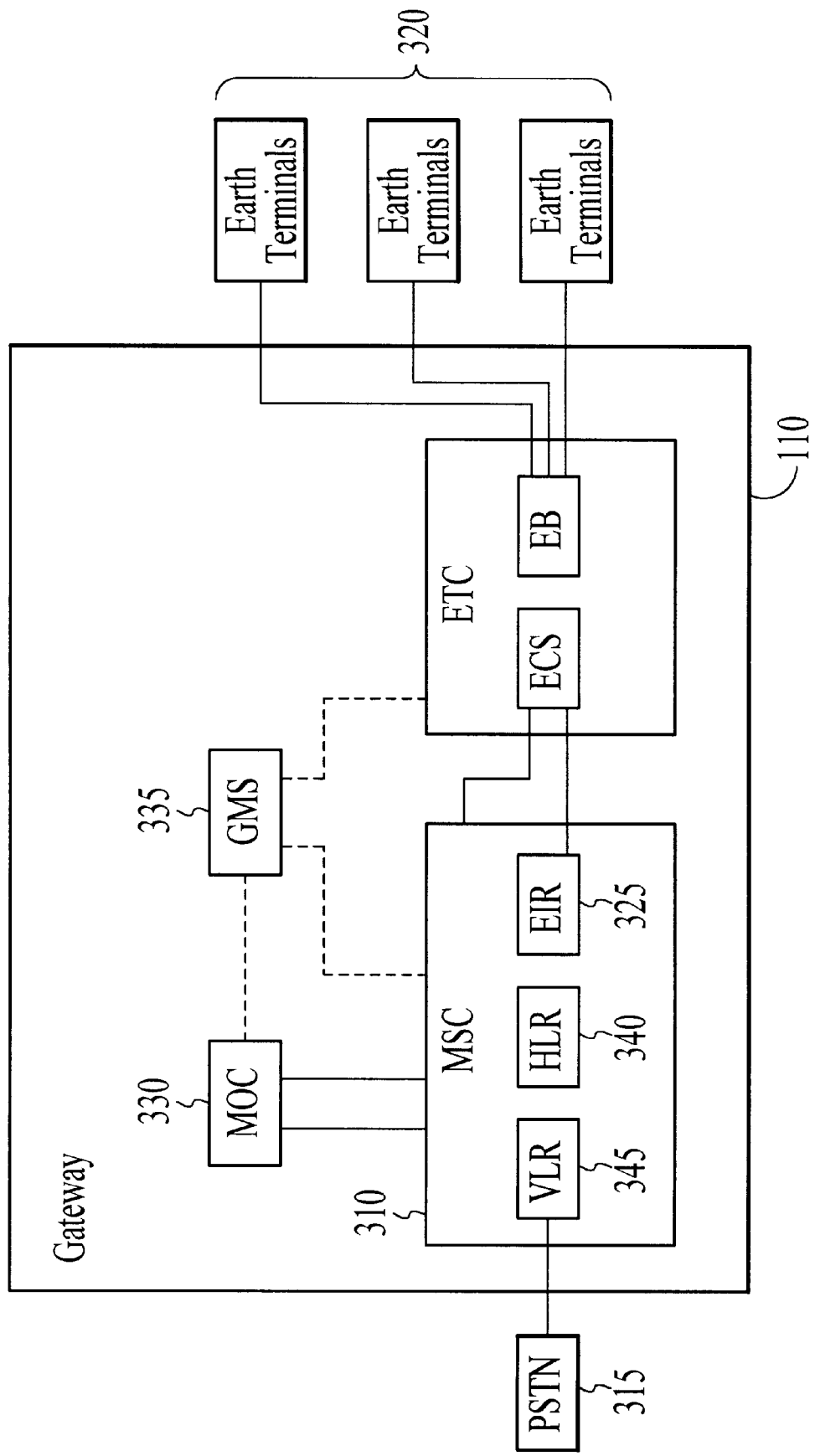
FIG. 3 illustrates a gateway of the global telecommunications network of FIG. 1.

FIG. 3 illustrates in more detail a preferred embodiment of the gateway 110 of the system 100. The heart of the gateway 110 is the Mobile Switching Center 310 (MSC) or the "switch". An example of a switch 310 which may be used is the Siemens GSM-D900 switch. The switch 310 has two "sides": a land side which connects to the local telephone network via the PSTN 315, and a mobile side which connects to Earth Terminal Controllers 320 which communicate with the satellite constellation 105 using K-band radio links. The switch also has a terrestrial connection on the ground which connects the gateways 110, allowing inter-gateway communications. Information for the physical subscriber equipment (WSU 130, pager 135, etc.) is kept in the Equipment Identification Register 325 (EIR). The gateway's 110 Message Origination Controller 330 (MOC) supports a variety of messaging services such as direct messaging to pagers. The Gateway Management System 335 (GMS) provides operations, administration, and maintenance support for each of the gateway subsystems.

In addition to the EIR 325, the switch 330 includes a Home Location Register 340 (HLR) and a Visited Location Register 345 (VLR). The HLR 340 stores subscriber service information for the "Home Gateway". A Home Gateway is assigned to each subscriber to the system 100 and is related to the LAC at which the subscriber is based. The Home Gateway is responsible for granting system access. Whenever a subscriber places or receives a call, the system 100 will determine the subscriber's location with accuracy sufficient for call control. The Home Gateway will receive and evaluate this location information to determine whether it is permissible for the call to proceed. This feature is essential to help ensure compliance with calling restriction laws in nations where such laws exist.

The Home Gateway is also responsible for the assignment of a Visited Gateway as part of the system access process. Subscriber location information is used to index into a map of the world kept at the Home Gateway. This determines a LAC for the visited location which in turn will be used to identify a Visited Gateway which will serve and control the mobile subscriber end of a call.

The Visited Gateway temporarily retains a copy of select subscriber information in its VLR 345. This information remains within the Visited Gateway until the subscriber "roams" into a new Visited Gateway territory or until it expires. When a subscriber is at "Home", the Visited Gateway and the Home Gateway are one and the same.

Figure 4:
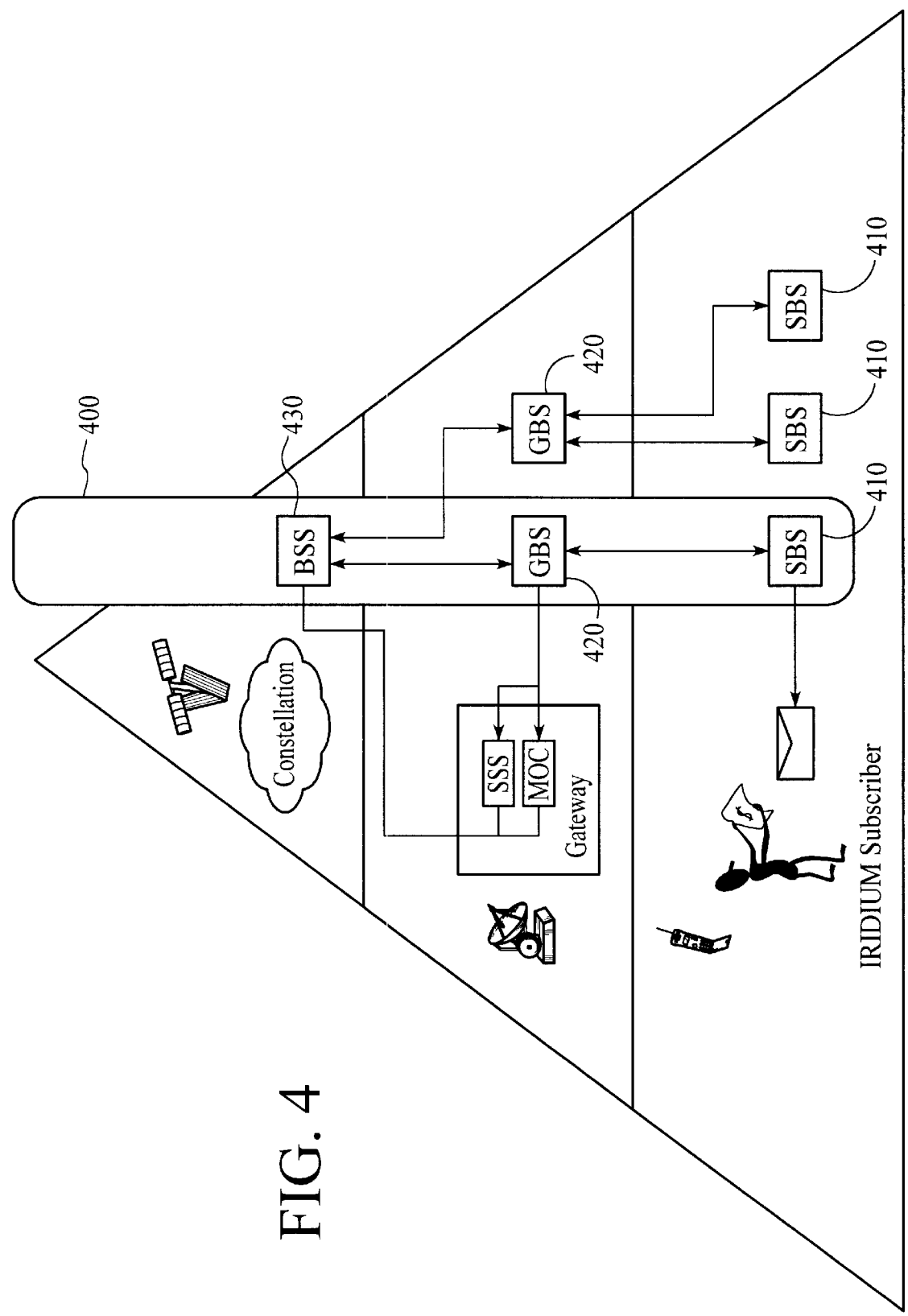
FIG. 4 illustrates a business system for managing the telecommunications network of FIG. 1.

To manage usage information of the system 100, a business system 400 is used. FIG. 4 illustrates a preferred embodiment of a business system 400 which may be used with the present invention. The business system 400 comprises three subsystems: the Service Business System 410 (SBS), the Gateway Business System 420 (GBS), and the Business Support System 430 (BSS).

The SBS 410 includes service providers who sell subscriptions for usage of the telecommunications system 100 directly to the consumer and roaming partners who resells usage of the system 100 and also provide other telecommunications services in their own systems. SBS 410 functions include pre-sales support, service negotiation, general and billing inquiries, payment remittance, pricing and invoicing, receivables management, and account profile maintenance.

The GBS 420 includes gateways 110 (FIG. 1) of the telecommunications system 100 and their operators. The functions of the GBS 420 includes service activation, Tier II customer support, payment and settlement processing, service provider management, usage collection, and retail rating. These functions are performed in the gateways 110.

The functions of the BSS 430 includes gateway relationship management, financial and treasury management, and usage collection. They also include usage verification, revenue distribution, settlement statement generation, and payable/receivable processing. These functions are managed by a Clearinghouse and occurs in the satellites 105.

Figure 5:
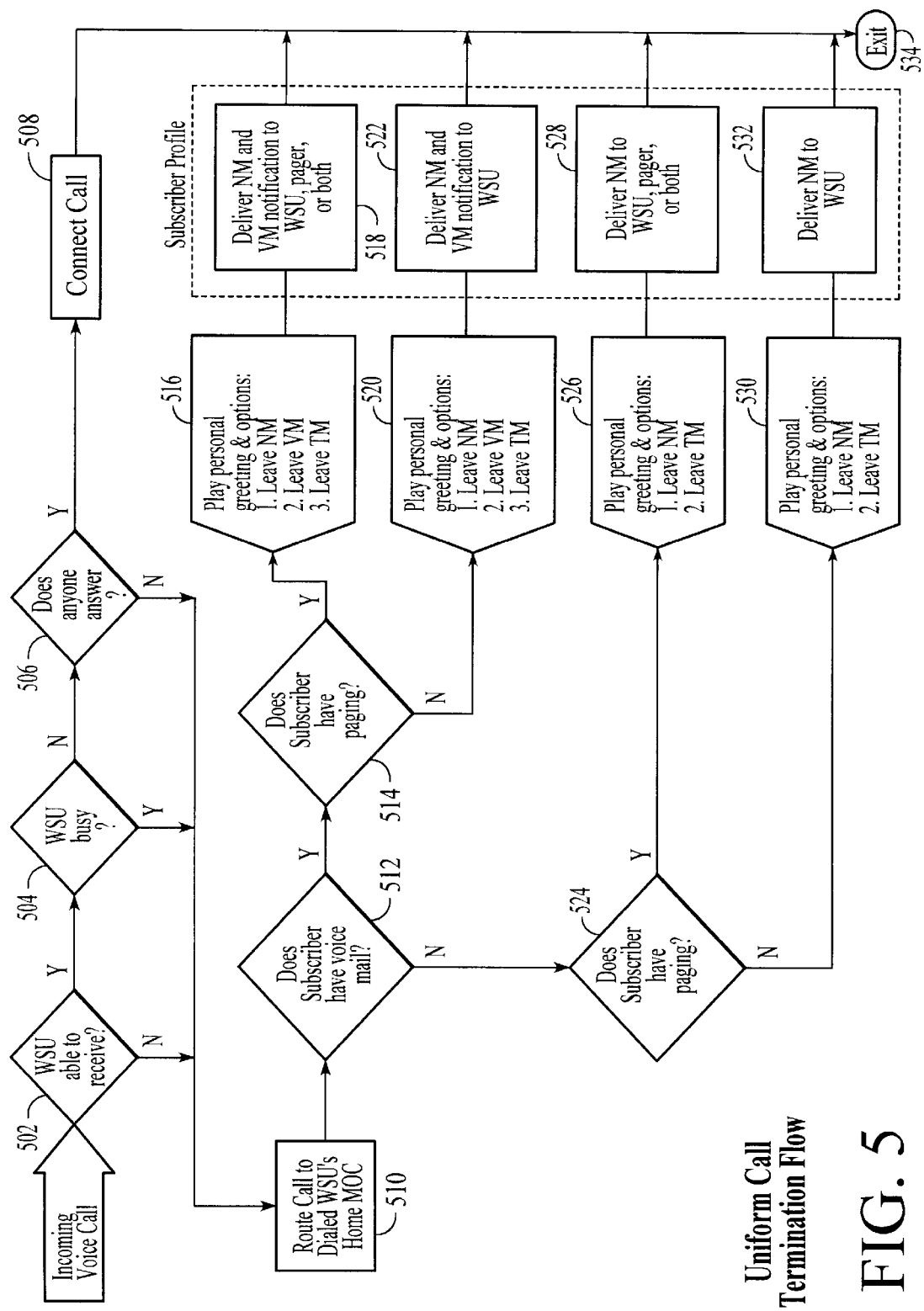
FIG. 5 is a flow chart illustrating the preferred embodiment of the method for uniform call termination treatment in accordance with the present invention.

FIG. 5 is a flow chart illustrating a preferred embodiment of a method for uniform call termination treatment in accordance with the present invention. When a voice call comes into the network 100, the network 100 determines whether the WSU is able to receive, via step 502. If it is, then the network determines if the WSU is busy, via step 504. If not, then the network determines if the WSU is answered within a predetermined period of time, via step 506. If it is answered, then the call is connected, via step 508. If the WSU is not reachable, is busy, or is not answered, then the incoming call is routed to the MOC 330 of the WSU's Home Gateway, via step 510. The MOC 330 determines if the subscriber's account includes network voicemail services, via step 512. If it does, then the MOC 330 determines if the subscriber's account also includes network messaging services, such as paging services, via step 514. If the subscriber's account has both network voicemail and paging services, then the MOC 330 answers the call with voice prompts in a language selected by the subscriber for the caller to either leave a voice, numeric, or text message, via step 516. The message is stored in the subscriber's account and scheduled for future delivery to the subscriber's WSU, pager, or both the next time it can be reached by the network 100, via step 518. If the subscriber's account has network voicemail services but not network paging services, then the MOC 330 prompts the caller with the same three options as in step 516, via step 520, but the message will only be delivered to the subscriber's WSU, via step 522. If the subscriber's account does not have network voicemail services, the MOC 330 determines if the subscriber's account has network paging services, via step 524. If so, then the MOC 330 prompts the caller to leave a numeric or text message, via step 526. The numeric or text message or is then later delivered to the WSU, the pager, or both, the next time it can be reached by the network 100, via step 528.

If the subscriber's account does not have network paging or voicemail services, the MOC 330 prompts the caller to leave a numeric or text message as in step 526, via step 530, but this numeric or text message is then later delivered only to the WSU, via step 532.

Although the present invention has been described with prompts for voice, numeric, or text messages, one of ordinary skill in the art will understand and other options may be offered, such as forwarding the call to another location, without departing from the spirit and scope of the present invention.

If a caller selects the text message option, the caller is connected with an operator who enters the caller's message into the subscriber's account. The message then appears as text on the WSU or pager.

In delivering a numeric message to the subscriber's pager in the preferred embodiment, the MOC 330 will send the message to a Message Termination Controller (MTC). The MTC is located with the network's 100 master control. The MTC collects all of the pages from every gateway 110 and schedules the satellite constellation's 105 resources for delivery to the pager. When the caller's numeric message is sent to the MTC, the LAC of the subscriber's current location is also sent. The MTC then schedules the message for transmission over the constellation 105.

In delivering messages to the subscriber's WSU in the preferred embodiment, the message is routed from the MOC 330 to a Short-Message Service Center (SMS-C) in the Home Gateway. The SMS-C queries the HLR 340 and delivers the message via the switch 310, the Earth Terminal Controllers 320, and the constellation 105. If the subscriber's WSU is not reachable, a flag is set in the SMS-C indicating that a message is waiting. The message is stored in the subscriber's account record in the MOC 330 until such time as the WSU can be reached by the network 100 or the message ages out of the network 100. When the WSU receives the message, it sends an acknowledgement back to the SMS-C via the constellation 105 and switch 310.

To more particularly describe the features of the present invention, please refer to FIGS. 6 through 10 in conjunction with the discussion below.

Because the network 100 is a global telecommunications network, the method of the present invention must account for three different situations: when the subscriber roams within the network 100, when the subscriber roams outside of the network 100 and is currently in a Global System for Mobile (GSM) Communications protocol jurisdiction, and when the subscriber roams outside of the network 100 and is currently in an IS-41 protocol jurisdiction. GSM and IS-41 are two popular mobility management protocols used around the world for wireless operability and call processing between networks. These are well known in the art and will not be further discussed here.

Figure 6:
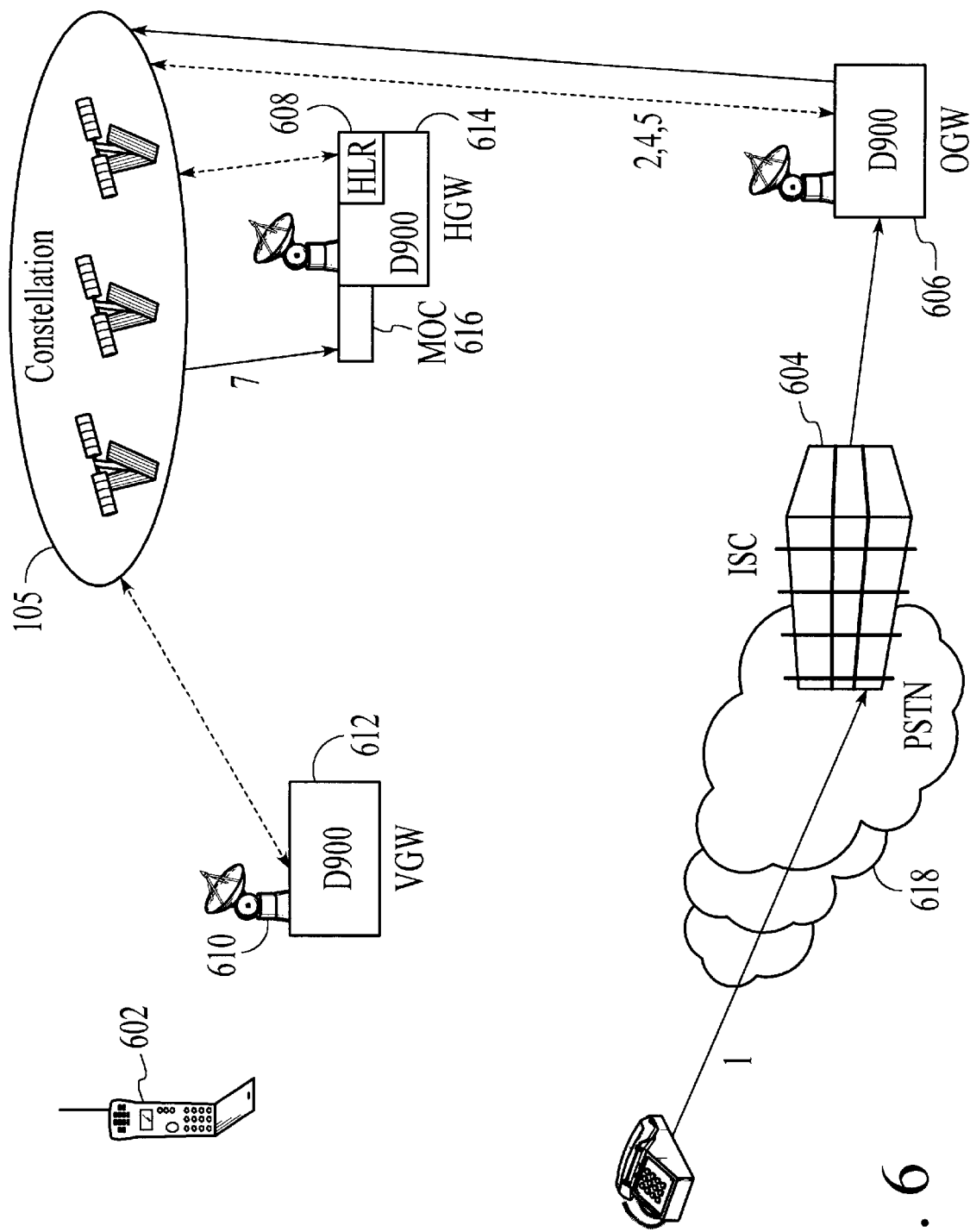
FIG. 6 illustrates the handling of an incoming voice call by the preferred embodiment of the present invention when the subscriber roams with the network.

FIG. 6 illustrates the handling of an incoming voice call by the preferred embodiment of the present invention when the subscriber roams within the network 100. In this example, the caller originates the call from a PSTN 618 by dialing the WSU's 602 phone number. The call is routed to the Originating Gateway (OGW) switch 606 via the International Switching Center 604 (ISC). The OGW is the gateway which services the territory in which the caller is located. The OGW switch 606 analyzes the digits dialed by the caller and queries the Home Gateway HLR 608 for routing information. The Home Gateway HLR 608 queries the Visited Gateway VLR 610 for the Mobile Subscriber Roaming Number (MSRN). The MSRN is a unique identification number for the WSU 602 under the GSM. After receiving the MSRN, the Home Gateway HLR 608 returns the MSRN to the OGW switch 606. The OGW switch 606 routes the call to the Visited Gateway switch 612.

The Visited Gateway switch 612 then attempts to route the call to the WSU 602. If the WSU 602 is busy, not reachable, or is not answered, the Visited Gateway switch 612 obtains forwarding information from its VLR 610. The Visited Gateway switch 612 then reroutes the call to the Home Gateway switch 614. The OGW switch 606 analyzes the forwarding information and routes the call to the Home Gateway switch 614, which routes the call to the MOC 616. One of the steps 516 through 530 of FIG. 5 is then performed by the MOC 616.

Figure 7:
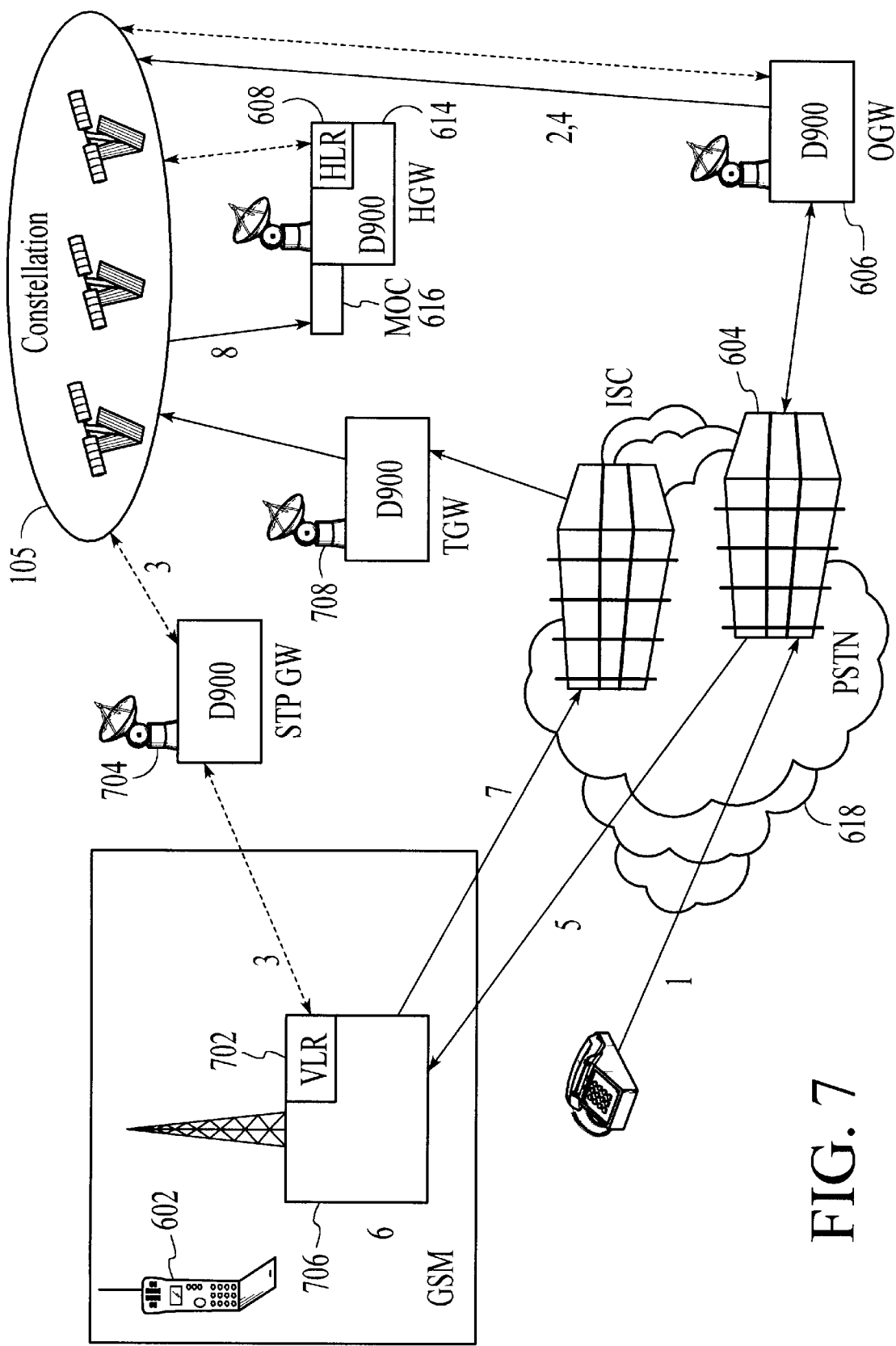
FIG. 7 illustrates the handling of an incoming voice call by the preferred embodiment of the present invention when the subscriber roams outside the network and is currently in a Global System for Mobile Communications protocol jurisdiction.

FIG. 7 illustrates the handling of an incoming voice call by the preferred embodiment of the present invention when the subscriber roams outside the network 100 and is currently in a GSM jurisdiction. In this example, the caller originates the call from a PSTN 618 by dialing the WSU's 602 phone number. The call is routed to the OGW switch 606 via the ISC 604. The OGW switch 606 analyzes the digits dialed by the caller and queries the Home Gateway HLR 608 for routing information. The Home Gateway HLR 608 queries the Visited Gateway MSC VLR 702 for the MSRN via the Signal Transfer Point Gateway 704 (STP GW). After receiving the MSRN, the Home Gateway HLR 608 returns the MSRN to the OGW switch 606. The OGW switch 606 routes the call to the Visited Gateway MSC 706 via the ISC 604.

The Visited Gateway MSC 706 then attempts to route the call to the WSU 602. If the WSU 602 is busy, not answering, or not reachable, the Visited Gateway MSC 706 obtains forwarding information from its VLR 702. The Visited Gateway MSC 706 then routes the call to the Terminating Gateway (TGW) switch 708. The TGW is the gateway serving the territory in which the cellular territory servicing the WSU 602 is located. The TGW switch 708 analyzes the forwarding information and reroutes the call to the Home Gateway switch 614, which in turn routes the call to its MOC 616. One of the steps 516 through 530 is then performed by the MOC 616.

Figure 8:
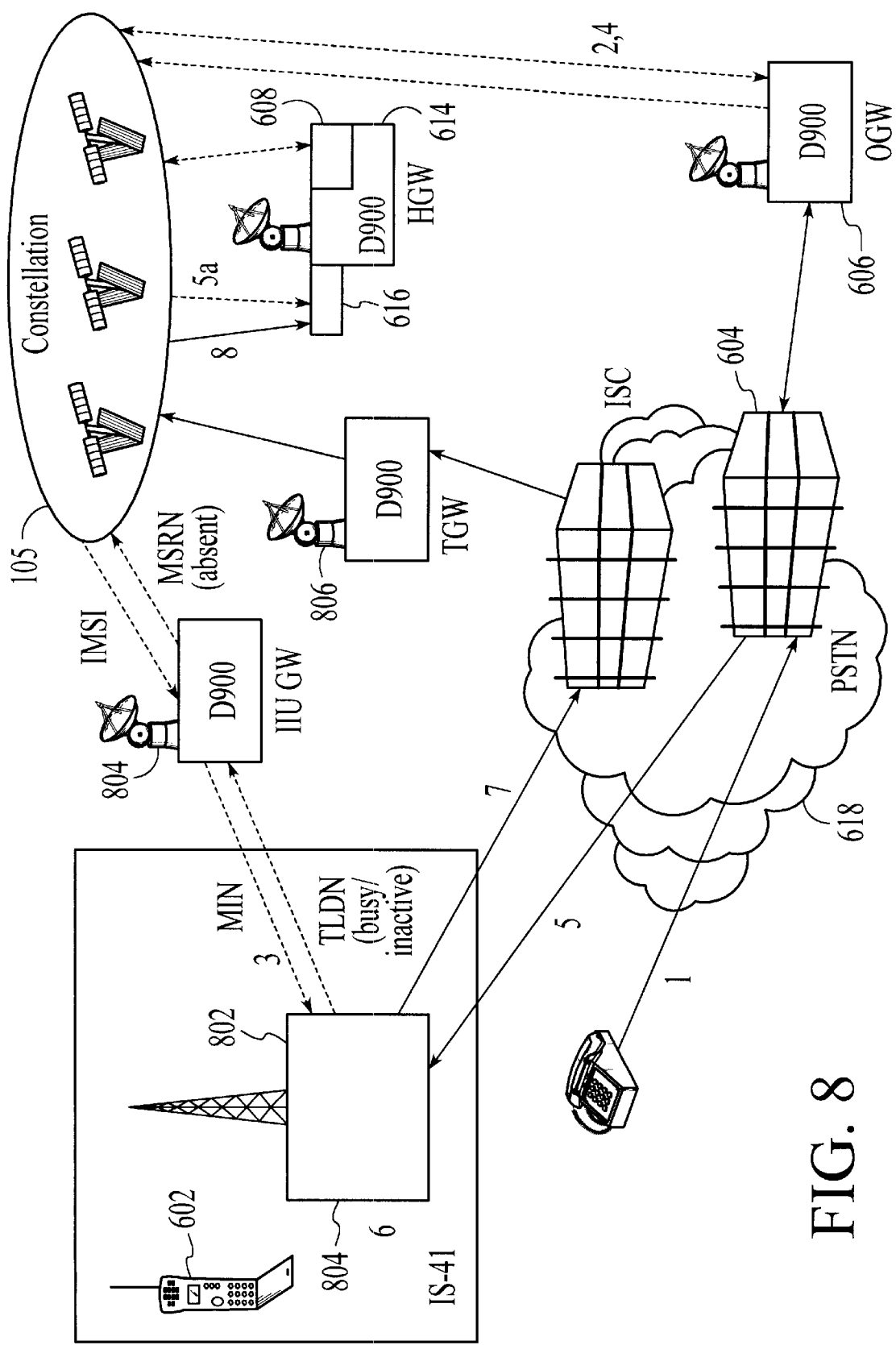
FIG. 8 illustrates the handling of an incoming voice call by the preferred embodiment of the present invention when the subscriber roams outside the network and is currently in an IS-41 protocol jurisdiction.

FIG. 8 illustrates the handling of an incoming voice call by the preferred embodiment of the present invention when the subscriber roams outside the network 100 and is currently in an IS-41 jurisdiction. In this example, the caller originates the call from a PSTN 618 by dialing the WSU's 602 phone number. The call is routed to the OGW switch 606 via the ISC 604. The OGW switch 606 analyzes the digits dialed by the caller and queries the Home Gateway HLR 608 for routing information. The Home Gateway HLR 608 queries the Visited Gateway MSC VLR 802 for the MSRN via the Internetworking Unit 804. The Internetworking Unit allows cross protocol communications. After receiving the MSRN, the Home Gateway HLR 608 returns the MSRN to the OGW switch 606. The OGW switch 606 routes the call to the Visited Gateway MSC 804 via the ISC 604.

The Visited Gateway MSC 804 then attempts to route the call to the WSU 602. If the WSU 602 is busy, not answering, or not reachable, then the Visited Gateway MSC 804 obtains forwarding information from the Internetworking Unit 804. The Visited Gateway MSC 804 then routes the call to the TGW switch 806. The TGW switch 806 analyzes forwarding information and reroutes the call to the Home Gateway switch 614, which in turn routes the call to the MOC 616. One of the steps 516 through 530 is then performed by the MOC 616.

Figure 9:
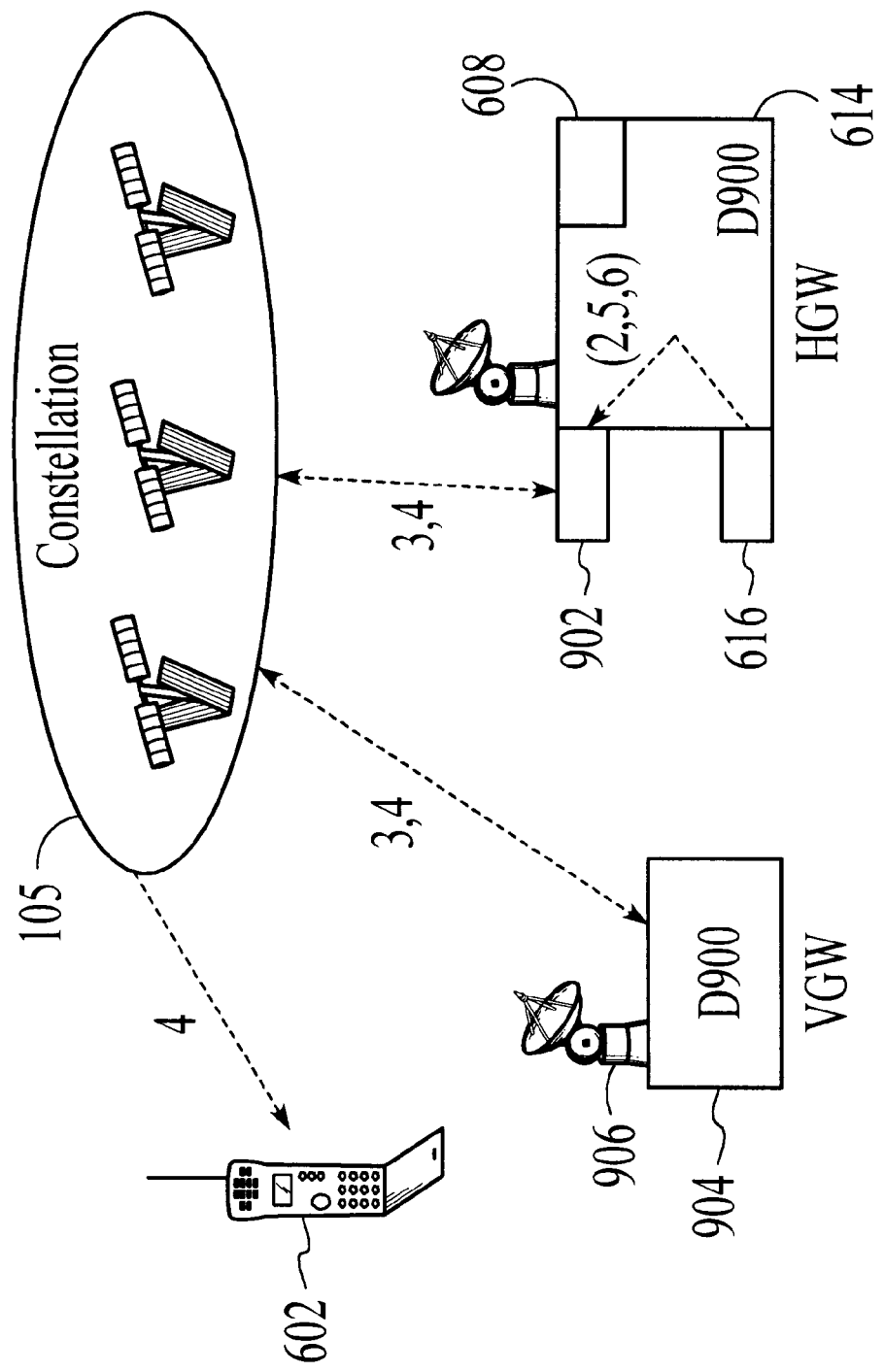
FIG. 9 illustrates a preferred embodiment of message delivery to the subscriber unit in accordance with the present invention.
Figure 10:
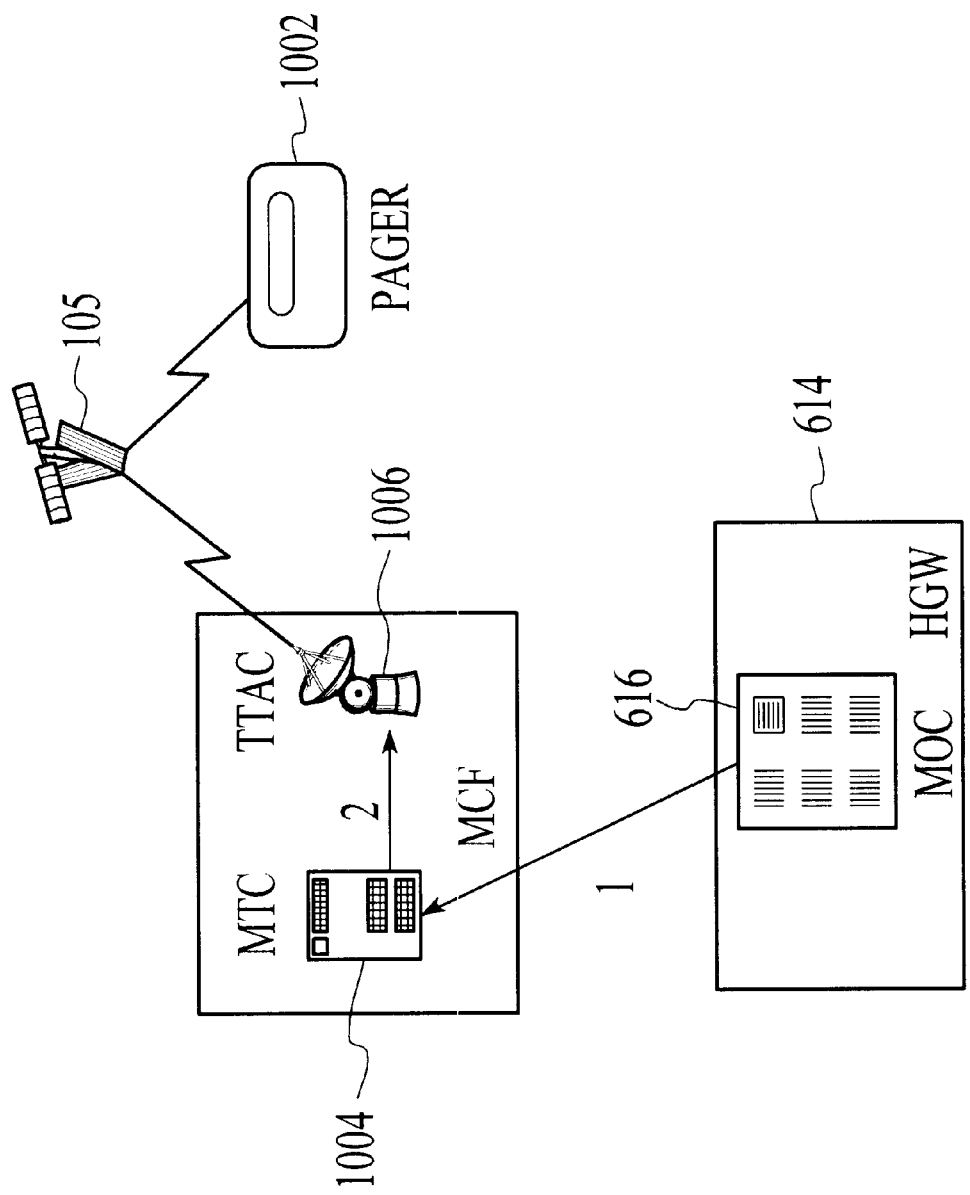
FIG. 10 illustrates a preferred embodiment of message delivery to the subscriber's pager in accordance with the present invention.

FIGS. 9 and 10 illustrate the delivery of the caller's message by the preferred embodiment of the method in accordance with the present invention (steps 578 through 532, FIG. 5). FIG. 9 illustrates a preferred embodiment of message delivery to the subscriber's WSU 602 in accordance with the present invention. The MOC 616 stores the caller message in the SMS-C 902. The SMS-C 902 queries the HLR 608 for routing 15 information. The HLR 608 returns the information to the SMS-C 902. The SMS-C 902 forwards the message to the Visited Gateway switch 904. The Visited Gateway switch 904 then attempts to deliver the message to the WSU 602. If it is successful, the process is complete. If the WSU 602 is still not reachable, then this condition is reported back to the SMS-C 902, and a Message Pending flag is set in the Visited Gateway VLR 906. Once the WSU 602 is detected as being active by the Visited Gateway, or once the WSU 602 registers with another Visited Gateway, the HLR 608 is informed that the WSU 602 is once again reachable. The HLR 608 then informs the SMS-C 902 that this is so. The SMS-C 902 then reinitiates the process to send the message. Once the message is delivered, the process is complete.

FIG. 10 illustrates a preferred embodiment of message delivery to the subscriber's pager 1002 in accordance with the present invention. The MOC 616 sends the message to the MTC 1004 for delivery. The MTC 1004 schedules the message for delivery. When the message is delivered, it is sent to the subscriber's pager 1002 via Telemetry, Tracking and Control 1006 and the constellation 105. Once the message is delivered, the process is complete.

Although the present invention has been described in the context of a call initiating from a PSTN, one of ordinary skill in the art will understand that the call may originate from other sources, such as another WSU, without departing from the spirit and scope of the present invention.

A method for uniform call termination treatment for a global telecommunications network which allows subscribers to receive information and for network providers to bill for the use of their network when a network phone is not reachable, not answered, or busy has been disclosed. A caller is given the same option to leave either a voice message, a numeric message, or a text message under each of the above circumstances. Because calls are uniformly completed, network providers can bill for each call, minimizing lost revenue. Subscribers have the added benefit of being notified that a call was attempted and that a message was left. The subscribers then may return the call using the wireless subscriber unit, resulting in more revenue for the network.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for uniform call termination treatment in a global telecommunications network, the network including subscribers with wireless subscriber units, comprising the steps of:

(a) receiving calls for the wireless subscriber units for the global telecommunications network;

(b) determining unconnected calls that cannot be connected to their respective wireless subscriber units;

(c) routing the unconnected calls to a message origination controller;

(d) uniformly providing each caller of the unconnected calls an option to leave a voice message, a numeric message, or a text message for a respective subscriber, wherein the providing step (d) comprises the steps of:

(d1) determining if the respective subscriber has network voice mail service;

(d2) determining if the respective subscriber has network numeric messaging service;

(d3) uniformly providing each of the callers of the unconnected calls with a first option to leave a voice message and a second option to leave a text message if the respective subscriber has network voicemail service;

(d4) uniformly providing each of the callers of the unconnected calls with the second option to leave a text message and a third option to leave a numeric message if the respective subscriber has the network numeric messaging service;

(d5) storing each of the caller's messages at the message origination controller; and (e) delivering the message to the respective subscriber.

2. The method of claim 1, wherein the delivering step (e) comprises the steps of:

(e1) delivering a notification of a voice or text message to the respective subscriber's wireless subscriber unit or network pager, or to both the respective subscriber's wireless subscriber unit and network pager, if the respective subscriber has network voicemail service; and (e2) delivering a numeric or text message to the respective subscriber's wireless subscriber unit or network pager, or to both the respective subscriber's wireless subscriber unit and the network pager, if the respective subscriber has the network numeric messaging service.

3. A method for uniform call termination treatment in a global telecommunications network, the network including subscribers with wireless subscriber units, comprising the steps of:

(a) receiving calls to the wireless subscriber units for the global telecommunications network;

(b) determining unconnected calls that cannot be connected to their respective wireless subscriber units, wherein the subscriber units are unreachable, busy, or not being answered;

(c) routing the unconnected calls to the respective subscriber's wireless subscriber unit's home gateway message origination controller;

(d) determining if the respective subscriber has network voicemail service;

(e) determining if the respective subscriber has a network numeric messaging service;

(f) uniformly providing each caller of the unconnected calls with a first option to leave a voice message and a second option to leave a text message if the respective subscriber has network voicemail service;

(g) uniformly providing each caller with the second option to leave a text message and a third option to leave a numeric message if the respective subscriber has network numeric messaging service;

(h) delivering a notification of the voice or text message to the respective subscriber's wireless subscriber unit or pager, or to both the respective subscriber's wireless subscriber unit and network pager, if the respective subscriber has network voicemail service; and (i) delivering the numeric or text message to the respective subscriber's wireless subscriber unit or network pager, or to both the respective subscriber's wireless subscriber unit and network pager, if the respective subscriber has network numeric messaging service.

4. A system for uniform call termination treatment in a global telecommunications network, comprising:

wireless subscriber units for the global telecommunications network;

means for receiving calls to the wireless subscriber units;

means for determining calls that cannot be connected to their respective subscriber to the wireless subscriber units; and a message origination controller wherein the controller contains computer instructions for receiving the unconnected calls and for uniformly providing each caller of unconnected calls an option to leave a voice messages a numeric message, or a text message for a respective subscriber, wherein the controller comprises:

means for determining if the respective subscriber has network voice mail service means for determining if the respective subscriber has network numeric messaging service;

means for uniformly providing each of the callers of the unconnected calls with a first option to leave a voice message and a second option to leave a text message if the respective subscriber has network voicemail service;

means for uniformly providing each of the callers of the unconnected calls with the second option to leave a text message and a third option to leave a numeric message if the respective subscriber has the network numeric messaging service; and means for storing each of the caller's messages.

5. The system of claim 4, wherein the receiving means comprises:

a source from which each call is initiated;

an originating gateway wherein each call is routed from the source to the originating gateway; and a visited gateway wherein each call is routed from the originating gateway to the visited gateway.

6. The system of claim 4, wherein the attempting means comprises a visited gateway which attempts to route each call to its respective wireless subscriber unit.

7. A computer readable medium with computer instructions for providing a uniform call termination treatment in a global telecommunications network, the network including subscribers and wireless subscriber units, the computer instructions for:

(a) receiving calls for the wireless subscriber units for the global telecommunications network;

(b) determining unconnected calls that cannot be connected to the wireless subscriber units; and (c) uniformly providing alternative call termination treatment option for each of the unconnected calls and each controller of unconnected calls an option to leave a voice message a numeric message, or a text message for a respective subscriber;

(d) uniformly providing each caller of the unconnected calls an option to leave a voice message, a numeric message, or a text message for a respective subscriber, wherein the providing step (d) comprises the steps of:

(d1) determining if the respective subscriber has network voice mail service;

(d2) determining if the respective subscriber has network numeric messaging service;

(d3) uniformly providing each of the callers of the unconnected calls with a first option to leave a voice message and a second option to leave a text message if the respective subscriber has network voicemail service;

(d4) uniformly providing each of the callers of the unconnected calls with the second option to leave a text message and a third option to leave a numeric message if the respective subscriber has the network numeric messaging service;

(d5) storing each of the caller's messages at the message origination controller; and (e) delivering the message to the respective subscriber.

* * * * *